(12) United States Patent
Park

(10) Patent No.: US 9,740,206 B2
(45) Date of Patent: Aug. 22, 2017

(54) DRIVING TEST SYSTEM FOR A MOVING OBJECT

(71) Applicant: HYUNDAI MOTOR COMPANY, Seoul (KR)

(72) Inventor: Sangkyu Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/961,482

(22) Filed: Dec. 7, 2015

(65) Prior Publication Data

US 2016/0334789 A1    Nov. 17, 2016

(30) Foreign Application Priority Data

May 11, 2015  (KR) .................. 10-2015-0065570
Nov. 27, 2015 (KR) .................. 10-2015-0167328

(51) Int. Cl.
| | | |
|---|---|---|
| *G05D 1/00* | (2006.01) | |
| *B60W 30/14* | (2006.01) | |
| *B62D 15/02* | (2006.01) | |
| *B64C 39/02* | (2006.01) | |
| *B64F 1/22* | (2006.01) | |

(Continued)

(52) U.S. Cl.
CPC ......... *G05D 1/0094* (2013.01); *B60W 30/143* (2013.01); *B62D 15/025* (2013.01); *B64C 39/024* (2013.01); *B64D 47/08* (2013.01); *B64F 1/22* (2013.01); *G05D 1/0011* (2013.01); *G05D 1/0212* (2013.01); *G05D 1/0276* (2013.01); *G05D 2201/0213* (2013.01)

(58) Field of Classification Search
CPC .. G05D 1/0094; G05D 1/0011; G05D 1/0212; G05D 1/0276; G05D 2201/0213; B60W 30/143; B62D 15/025; B64C 39/024; B64D 47/08; B64F 1/22
See application file for complete search history.

(56) References Cited

U.S. PATENT DOCUMENTS

| | | | |
|---|---|---|---|
| 7,894,948 B2* | 2/2011 | Stroud .................. | G01S 5/0027 701/11 |
| 2006/0069962 A1* | 3/2006 | Dittmann ............ | G01M 13/027 714/40 |

(Continued)

FOREIGN PATENT DOCUMENTS

| | | |
|---|---|---|
| JP | H08-337303 A | 12/1996 |
| KR | 10-2008-0033321 A | 4/2008 |
| KR | 10-2009-0076270 A | 7/2009 |

OTHER PUBLICATIONS

Choi, Jae-Young et al., Dept. of Mechanical Engineering, Kongju National University, "Study on the Improved Target Tracking for the Collaborative Control of the UAC-UGV", Journal of Institute of Control, Robotics and Systems (2013) 19(5): pp. 450-456.

*Primary Examiner* — Calvin Cheung
(74) *Attorney, Agent, or Firm* — Brinks Gilson & Lione

(57) ABSTRACT

One form of a driving test system for a moving object includes: an unmanned aircraft configured to fly at a set distance from the moving object that is configured to drive along a set route in a set zone and has a vision sensor disposed on one side that is configured to detect the moving object's motion; and a controller configured to control the flight of the unmanned aircraft to follow the moving object and to transmit to the vision sensor and to receive from the vision censor, detected motion characteristics of the moving object.

12 Claims, 7 Drawing Sheets

(51) Int. Cl.
*G05D 1/02* (2006.01)
*B64D 47/08* (2006.01)

(56) References Cited

U.S. PATENT DOCUMENTS

| | | | | |
|---|---|---|---|---|
| 2006/0271248 | A1* | 11/2006 | Cosgrove | B64C 39/024 |
| | | | | 701/2 |
| 2010/0042269 | A1* | 2/2010 | Kokkeby | G01S 3/7864 |
| | | | | 701/3 |
| 2011/0001657 | A1* | 1/2011 | Fox | G01S 7/2922 |
| | | | | 342/107 |
| 2011/0191079 | A1* | 8/2011 | Rzehorska | G01M 17/007 |
| | | | | 703/8 |
| 2015/0260526 | A1* | 9/2015 | Paduano | G01C 21/20 |
| | | | | 701/461 |
| 2016/0098612 | A1* | 4/2016 | Viviani | G06T 7/90 |
| | | | | 382/103 |

* cited by examiner

FIG. 2

| AEB  | ADAS |
| LDWS |      |
| LKAS |      |
| BSD  |      |
| SCC  |      |

DRIVING TEST SYSTEM FOR A MOVING OBJECT

CROSS-REFERENCE TO RELATED APPLICATION

This application claims priority to and the benefit of Korean Patent Application No. 10-2015-0065570 filed in the Korean Intellectual Property Office on May 11, 2015 and Korean Patent Application No. 10-2015-0167328 filed in the Korean Intellectual Property Office on Nov. 27, 2015, the entire contents of each of which are incorporated herein by reference.

BACKGROUND (a) Field

The present disclosure relates to a driving test system for a moving object that detects motion characteristics of the moving object traveling along a preset route and determines how the moving object, such as a vehicle, is functioning and driving.

(b) Description of the Related Art

In general, an autonomous test vehicle is a vehicle that is forced to drive continuously to evaluate the vehicle's driving performance so that intended test results can be obtained. This vehicle is used to perform a forced driving operation on a test road such as a Belgian road with a rough surface.

Thus, the autonomous test vehicle does not require a human driver to manually test-drive the vehicle. This saves the operator the trouble and risk of test driving, allows for severe driving tests, and improves the reliability of test results. Therefore, research, development, and studies on techniques and methods for automatically controlling testing and driving are ongoing.

Conventionally, the above autonomous test vehicle self-controls its driving by enabling a vision sensor unit installed at the front of the test vehicle to recognize road lanes and detect an approaching object.

That is, the driving of the autonomous test vehicle is controlled in response to a control tower's radio control signals, which are input through an antenna and radio transmitter/receiver installed on the vehicle, and a driving control unit automatically controls the driving of the vehicle through a pedal controller in response to an approaching object and lane recognition signals, which are input from an object detector and vision sensor unit using various sensors.

However, the operator's personal subjective view may influence a vehicle driving test, the accuracy of vehicle driving may be reduced, and the cost of labor may be increased.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a driving test system for a moving object capable of increasing the accuracy of performance tests of a moving object, such as a vehicle, and reducing the cost of labor.

An exemplary form of the present disclosure provides a driving test system for a moving object including: an unmanned aircraft configured to fly at a set distance from the moving object, where the moving object is configured to drive along a set route in a set zone and the moving object comprises a vision sensor disposed on one side that is configured to detect a motion of the moving object'; and a controller configured to control the flight of the unmanned aircraft to follow the moving object and to transmit to the vision sensor and to receive from the vision sensor, detected motion characteristics of the moving object.

The unmanned aircraft may control the moving object to implement a driving function including an advanced driver assistance system (ADAS), and the advanced driver assistance system may include autonomous emergency braking (AEB), a lane departure warning system (LDWS), a lane keeping assistance system (LKAS), blind spot detection (BSD), or smart cruise control (SCC). The vision sensor may detect lanes the moving object is traveling in and an obstacle near the moving object during implementation of the driving function.

The moving object may be controlled by the unmanned aircraft and may include a detector for detecting the moving object's surroundings.

The detector may detect lanes, an obstacle near the moving object, and the distance to the obstacle.

The moving object may be controlled by the unmanned aircraft and may have an autonomous driving function for automatically controlling a steering device, an accelerator, and a braking device.

The driving test system may further include: a conveyor with the unmanned aircraft's landing and takeoff spots set therein, which is disposed to move the unmanned aircraft from the landing spot to the takeoff spot; a landing marker formed on one side of the landing spot; a proximity sensor disposed on the other side of the landing spot to detect the unmanned aircraft; and photosensors disposed on one side of the takeoff spot to detect the unmanned aircraft.

The controller may determine the moving object's information, speed, and travel distance based on information detected by the vision sensor.

The controller may detect motion characteristics of the moving object using the advanced driver assistance system.

The driving test system may further include a radio transmitter/receiver and an antenna, and the controller may control the moving object''s driving function and the unmanned aircraft by the radio transmitter/receiver and the antenna.

An exemplary form of the present disclosure provides a driving test method for a moving object including: causing the moving object to enter a preset route and driving the moving object; flying an unmanned aircraft along with the moving object; and detecting motion characteristics of the moving object by a vision sensor mounted on the unmanned aircraft and determining how the moving object is driving.

The driving test method may further include controlling, by the unmanned aircraft, the moving object to implement a driving function including an advanced driver assistance system (ADAS), and the advanced driver assistance system may include autonomous emergency braking (AEB), a lane departure warning system (LDWS), a lane keeping assistance system (LKAS), blind spot detection (BSD), or smart cruise control (SCC).

The driving test method may further include detecting the moving object's surroundings by a detector.

The detector may detect lanes, an obstacle near the moving object, and the distance to an object in front of the moving object.

The driving test method may further include performing an autonomous driving function for automatically controlling a steering device, an accelerator, and a braking device.

The testing of moving objects such as autonomous vehicles or traditional vehicles using an unmanned aircraft can improve the test accuracy and reduce the cost of labor.

BRIEF DESCRIPTION OF THE DRAWINGS

FIG. 2 is a table showing functions implemented by the moving object.

DETAILED DESCRIPTION

An exemplary form of the present disclosure will hereinafter be described in detail with reference to the accompanying drawings.

Figure 1:
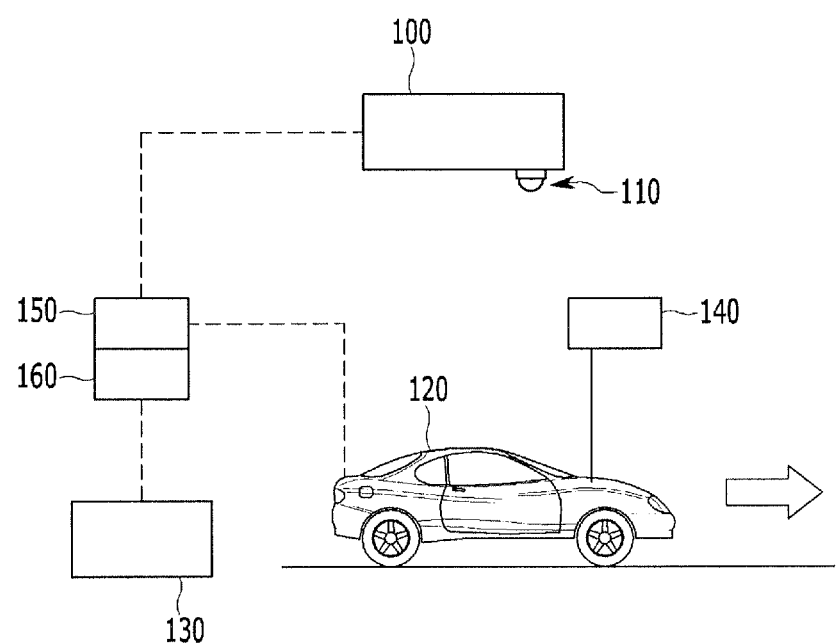
FIG. 1 is a schematic block diagram of a driving test system of a moving object.

FIG. 1 is a schematic block diagram of a driving test system for a moving object.

Figure 4:
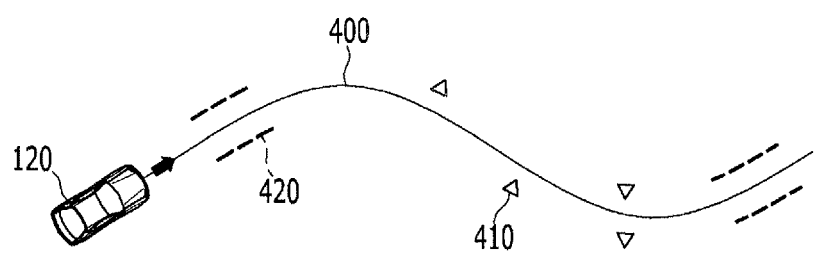
FIG. 4 is a partial schematic top plan view showing a path of travel of the moving object in the driving test system for the moving object.

Referring to FIG. 1 and FIG. 4, the driving test system for the moving object includes an unmanned aircraft 100, a vision sensor 110, the moving object 120, a detector 140, an antenna 150, a radio transmitter/receiver 160, and a controller 130.

The moving object 120 includes an autonomous vehicle or a traditional vehicle that is set to travel along a route 400 set either manually or autonomously.

The unmanned aircraft 100 is autonomously controlled by the controller 130 to move along with the moving object 120 at a set distance above the moving object 120. For example, the moving object 120 may be controlled by the unmanned aircraft 100.

The vision sensor 110 disposed at the unmanned aircraft 100 detects motion of the moving object 120 and checks information on the moving object 120. Also, the vision sensor 110 may detect a lane in which the moving object is driving and an obstacle and may detect a distance between the moving object and the obstacle.

Moreover, the detector 140 installed on the moving object 120 detects lanes 420 and an obstacle 410 near the moving object, and detects the distance to the obstacle 410.

The controller 130 may be implemented as one or more microprocessors operating by a preset program, and the preset program may include a series of commands for performing a method according to the exemplary embodiment of the present invention.

Figure 2:
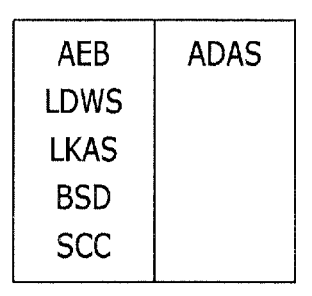

FIG. 2 is a table showing functions implemented by the moving object.

The moving object 120 may implement a driving function which includes an advanced driver assistance system (ADAS). For example, the unmanned aircraft 100 may control the moving object 120 to implement (or perform) the driving function that includes the advanced driver assistance system.

The advanced driver assistance system may include autonomous emergency braking (AEB), a lane departure warning system (LDWS), a lane keeping assistance system (LKAS), blind spot detection (BSD), or smart cruise control (SCC).

The description of the well-known art can be substituted for the description of the advanced driver assistance system, and a detailed description of the advanced driver assistance system will be omitted.

Figure 3:
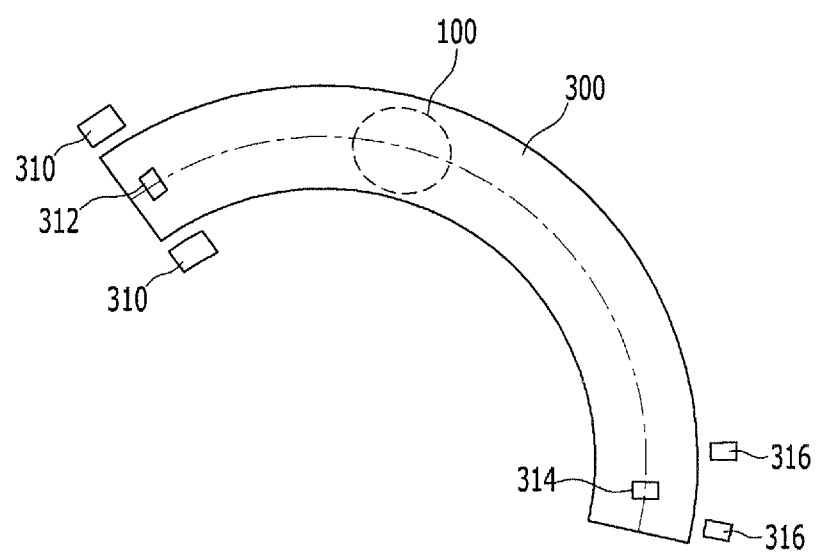
FIG. 3 is a schematic top plan view of a conveyer where an unmanned aircraft takes off and lands, in the driving test system for the moving object.

FIG. 3 is a schematic top plan view of a conveyer where an unmanned aircraft takes off and lands, in the driving test system for the moving object.

Referring to FIG. 3, the conveyer 300 is disposed along a set route, and landing markers 310 are disposed on either side of one end of the conveyer 300. Moreover, a first proximity sensor 312 is disposed between the landing markers 310.

Photosensors 316 are disposed on the other end of the conveyer 300, spaced a set distance apart in the direction the conveyor 300 moves, and a second proximity sensor 314 is disposed between the photosensors 316.

The unmanned aircraft 100 detects the landing markers 310 by the vision sensor 110, and lands between the landing markers 310. Then, the first proximity sensor 312 detects the unmanned aircraft 100.

When the unmanned aircraft 100 is detected by the first proximity sensor 312, the conveyor 300 goes into operation and moves the unmanned aircraft 100.

When the unmanned aircraft 100 is located between the photosensors 316 and the second proximity sensor 314 detects the unmanned aircraft 100, the conveyor 300 stops operating and prepares for takeoff of the unmanned aircraft 100.

FIG. 4 is a partial schematic top plan view showing a path of travel of the moving object in the driving test system of the moving object.

Referring to FIG. 4, the moving object 120 is set to move along the route 400, lanes 420 are formed on either side of the moving object 120, and the obstacle 410 is disposed in a set position. The moving object 120 may be controlled either manually or autonomously.

Figure 5:
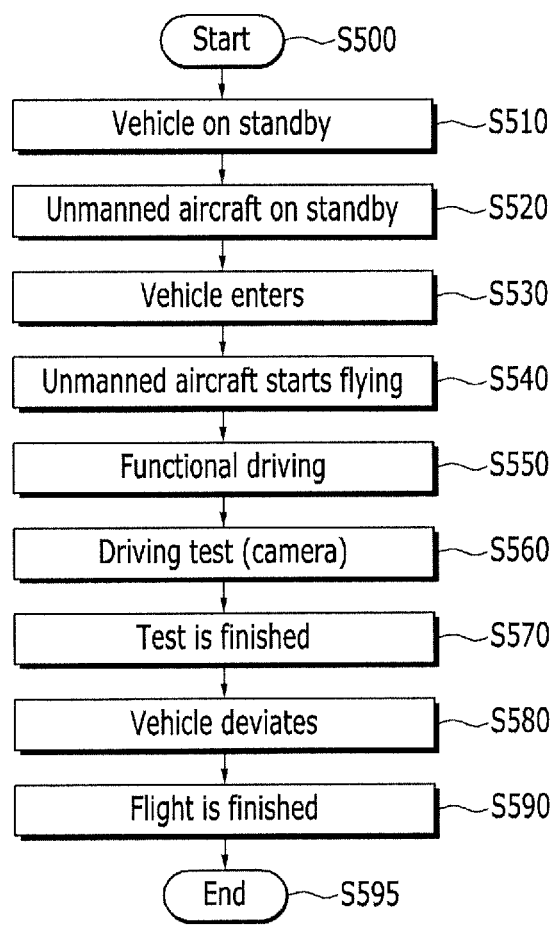
FIG. 5 is a flowchart showing a driving test method of the moving object.

FIG. 5 is a flowchart showing a driving test method of the moving object.

Referring to FIG. 5, control is started at S500, and the moving object 120 such as the autonomous vehicle or the traditional vehicle and the unmanned aircraft 100 are on standby at S510 and S520.

The moving object 120 enters the path 400, either by the controller 130 or by the operator at S530, and the unmanned aircraft 100 flies along with the moving object 120 at S540.

The moving object 120 performs functional driving at S550. The functional driving may include implementing an advanced driver assistance system (ADAS), and the advanced driver assistance system may include autonomous emergency braking (AEB), a lane departure warning system (LDWS), a lane keeping assistance system (LKAS), blind spot detection (BSD), or smart cruise control (SCC).

That is, the operator or the controller 130 selectively operates the advanced driver assistance system to control the driving of the moving object 120 at S550, motion characteristics of the moving object 120 are detected by the unmanned aircraft 100 at S560, and the driving test is finished at S570.

Then, the moving object 120 deviates from its route at S580, and the flight of the unmanned aircraft 100 is finished at S590.

In the exemplary form of the present disclosure, the motion characteristics of the moving object detected by the vision sensor 110 of the unmanned aircraft 100 may be transmitted to the controller 130 through the radio transmitter/receiver 160, and the controller 130 may determine how the moving object 120 is driving based on the received information.

Figure 6:
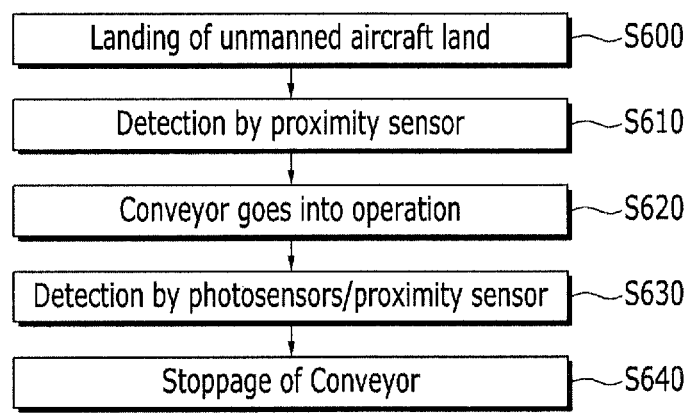
FIG. 6 is a flowchart showing an unmanned aircraft's landing and takeoff procedure in the driving test method for the moving object.

FIG. 6 is a flowchart showing an unmanned aircraft's landing and takeoff procedure in the driving test method for the moving object.

Referring to FIG. 6, the unmanned aircraft 100 lands at a landing spot in the conveyor 300 at S600. In this case, the vision sensor 110 of the unmanned aircraft 100 detects the landing markers 310, and the unmanned aircraft 100 lands at the corresponding location.

The first proximity sensor 312 detects the unmanned aircraft 100 at S610, and when it is determined that the unmanned aircraft 100 is detected, the conveyor 300 operates to move the unmanned aircraft 100 at S620.

The photosensors 316 or a proximity sensor detect that the unmanned aircraft 100 has reached the set landing spot at S630, and the conveyor 300 is stopped at S640. Also, the unmanned aircraft 160 starts flying in response to a set takeoff signal.

Figure 7:
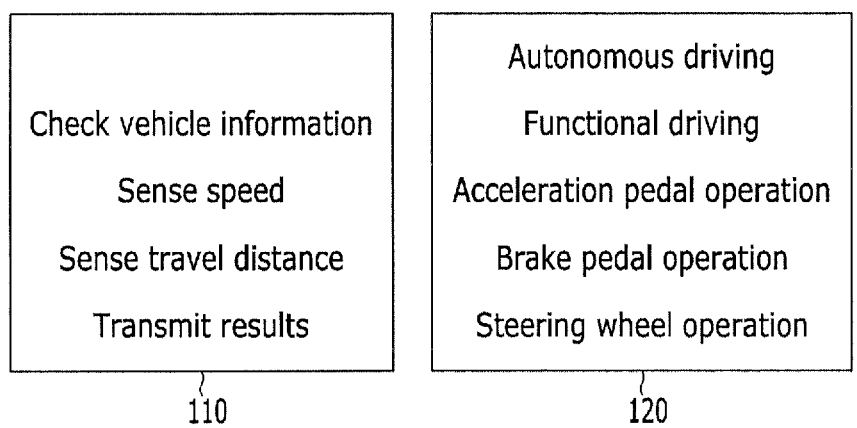
FIG. 7 is a table showing a vision sensor's functions and the moving object's functions in the driving test method of the moving object.

FIG. 7 is a table showing a vision sensor's functions and the moving object's functions in the driving test method of the moving object.

Referring to FIG. 7, the vision sensor 110 checks information of the moving object such as the autonomous vehicle or the traditional vehicle, detects the speed of the moving object 120, detects the distance traveled by the moving object 120, and transmits the results to the controller 130.

Also, the moving object 120 drives autonomously or performs each function in response to a control signal from the controller 130. In this case, the moving object 120 may be operated automatically by an accelerator pedal, brake pedal, and steering wheel of the moving object 120 by a set algorithm.

While forms of the present disclosure have been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

DESCRIPTION OF SYMBOLS

100: unmanned aircraft
110: vision sensor
120: moving object
130: controller
140: detector
150: antenna
160: radio transmitter/receiver
300: conveyor
310: landing marker
312: first proximity sensor
314: second proximity sensor
316: photosensor
400: route
410: obstacle
420: lane

What is claimed is:

1. A driving test system of a moving object comprising:
   an unmanned aircraft including a vision sensor disposed on one side of the unmanned aircraft, the unmanned aircraft configured to:
      fly at a set distance from the moving object, wherein the moving object is configured to drive along a set route in a set zone; and
      control the vision sensor to detect a motion of the moving object, wherein the vision sensor is configured to detect lanes in which the moving object is determined to be traveling in and detect an obstacle near the moving object during implementation of a driving function of the moving object; and
      control the moving object to implement an advanced driver assistance system (ADAS), wherein the ADAS comprises an autonomous emergency braking (AEB) system, a lane departure warning system (LDWS), a lane keeping assistance system (LKAS), a blind spot detection (BSD) system, a smart cruise control (SCC) system, or a combination thereof; and
   a controller configured to:
      control the flight of the unmanned aircraft to follow the moving object; and
      transmit, to the vision sensor, and receive, from the vision sensor, detected motion characteristics of the moving object.

2. The driving test system of claim 1, wherein the moving object is controlled by the unmanned aircraft and the moving object comprises a detector configured to detect surroundings of the moving object.

3. The driving test system of claim 2, wherein the detector is configured to detect lanes, an obstacle near the moving object, and a distance to the obstacle.

4. The driving test system of claim 1, wherein the moving object is controlled by the unmanned aircraft and has an autonomous driving function for automatically controlling a steering device, an accelerator, and a braking device.

5. The driving test system of claim 1, further comprising:
   a conveyor with landing and takeoff spots for the unmanned aircraft set therein, the conveyor configured to move the unmanned aircraft from the landing spot to the takeoff spot;
   a landing marker formed on one side of the landing spot;
   a proximity sensor disposed on the other side of the landing spot and configured to detect the unmanned aircraft; and
   photosensors disposed on one side of the takeoff spot that are configured to detect the unmanned aircraft.

6. The driving test system of claim 1, wherein the controller is configured to determine information, speed, and travel distance of the moving object based on information detected by the vision sensor.

7. The driving test system of claim 1, wherein the controller is configured to detect motion characteristics of the moving object using the advanced driver assistance system.

8. The driving test system of claim 1, further comprising a radio transmitter/receiver and an antenna,
   wherein the controller is configured to control, with the transmitter/receiver and the antenna, a driving function of the moving object and the unmanned aircraft.

9. A driving test method of a moving object comprising:
   causing the moving object to enter a preset route and controlling the moving object to travel according to the preset route;
   flying an unmanned aircraft along with the moving object;

detecting motion characteristics of the moving object by a vision sensor mounted on the unmanned aircraft and determining how the moving object is driving; and controlling, by the unmanned aircraft, the moving object to implement a driving function including an advanced driver assistance system (ADAS), wherein the ADAS comprises an autonomous emergency braking (AEB) system, a lane departure warning system (LDWS), a lane keeping assistance system (LKAS), a blind spot detection (BSD) system, a smart cruise control (SCC) system, or a combination thereof.

10. The driving test method of claim 9, further comprising detecting the moving object's surroundings by a detector.

11. The driving test method of claim 10, wherein the detector detects lanes, an obstacle near the moving object, and the distance to an object in front of the moving object.

12. The driving test method of claim 10, further comprising performing an autonomous driving function for automatically controlling a steering device, an accelerator, and a braking device.

* * * * *